United States Patent
Kim (10) Patent No.: US 6,602,021 B1
(45) Date of Patent: Aug. 5, 2003

(54) PAVEMENT MARKER AND METHOD FOR MANUFACTURING THE SAME

(76) Inventor: Kwung-Chul Kim, 109-403, Narae Apt. 564, Samseung-Ri, Yangju-Eup, Yangju-Gun, Kyunggi-Do (KR)

( * ) Notice: Subject to any disclaimer, the term of this patent is extended or adjusted under 35 U.S.C. 154(b) by 0 days.

(21) Appl. No.: 10/043,118

(22) Filed: Jan. 14, 2002

(51) Int. Cl.⁷ .......................... E01F 9/015; E01F 9/016
(52) U.S. Cl. .................. 404/16; 404/14; 116/63 R
(58) Field of Search .................. 404/9, 10, 11, 404/12, 13, 14, 15, 16, 93, 94; 116/63 P, 63 R (56) References Cited

U.S. PATENT DOCUMENTS

| | | | | |
|---|---|---|---|---|
| 4,049,358 A | * | 9/1977 | King et al. | 404/11 |
| 4,050,834 A | * | 9/1977 | Lee | 404/16 |
| 4,292,627 A | * | 9/1981 | Knight | 340/908 |
| 4,668,120 A | * | 5/1987 | Roberts | 404/12 |
| 4,955,982 A | * | 9/1990 | Paulos | 404/11 |
| 5,013,181 A | * | 5/1991 | Harrison | 404/12 |
| 5,074,706 A | * | 12/1991 | Paulos | 404/12 |
| 5,523,929 A | * | 6/1996 | Ogihara | 362/183 |
| 5,782,552 A | * | 7/1998 | Green et al. | 362/183 |
| 5,839,816 A | * | 11/1998 | Varga et al. | 362/153.1 |
| 5,984,570 A | * | 11/1999 | Parashar | 404/14 |
| 6,059,488 A | * | 5/2000 | Green | 404/12 |
| 6,079,899 A | * | 6/2000 | Green | 404/12 |
| 6,109,754 A | * | 8/2000 | Steele | 359/522 |
| 2002/0006313 A1 | * | 1/2002 | Pas | 404/13 |

FOREIGN PATENT DOCUMENTS

| | | | | |
|---|---|---|---|---|
| DE | 19511813 A1 | * | 10/1996 | E01F/9/04 |
| JP | 07259036 A | * | 10/1995 | E01F/9/04 |
| JP | 11222824 A | * | 2/1998 | E01F/9/04 |
| WO | WO 9830834 A | * | 7/1998 | F21L/13/00 |
| WO | WO 9906636 A | * | 2/1999 | E01F/9/016 |

* cited by examiner

Primary Examiner—Thomas B. Will
Assistant Examiner—Alexandra K. Pechhold
(74) Attorney, Agent, or Firm—Pennie & Edmonds LLP (57) ABSTRACT

A pavement marker includes a solar cell assembly arranged between an upper case defined with a sunlight opening and a lower cover formed with a stem portion. The solar cell assembly has solar cells and light emitting lamps. Reflective plates are respectively attached to both side surfaces of the upper case. The solar cell assembly includes a transparent resin block having an upper wall, support protrusions are formed on an inner surface of the upper wall, and a solar cell set having the solar cells and a printed circuit board is disposed in the transparent resin block to be brought into contact with the support protrusions.

3 Claims, 6 Drawing Sheets

PAVEMENT MARKER AND METHOD FOR MANUFACTURING THE SAME

BACKGROUND OF THE INVENTION

1. Field of the Invention

The present invention relates to a pavement marker which is used for allowing a median strip of a roadway to be easily discerned in the nighttime, and more particularly, the present invention relates to a pavement marker which is constructed in such a way as to maximize a light emissivity and improve a strength, and a method for manufacturing the same.

2. Background of the Related Art

Generally, a pavement marker is embedded, on a median strip, into the ground. Light emitting lamps are arranged in the pavement marker, and reflective plates are respectively attached to both side surfaces of the pavement marker, in a manner such that lights are emitted through the reflective plates. In this way, the pavement marker serves as auxiliary means for allowing a driver to easily discern the median strip while driving at the nighttime.

Such a pavement marker uses as its power source solar energy. That is to say, solar energy absorbed by solar cells in the daytime is converted into electric energy. Electric energy is then stored in a rechargeable battery to be used in the nighttime. Thus, the pavement marker can emit lights by itself without any separate power supply.

The conventional pavement marker constructed as mentioned above suffers from defects in that, since the pavement marker projects upward from a surface of a roadway, it repeatedly receives loads by automobile tires. Thereby, the reflective plates exposed to the outside are likely to be broken, and a possibility of an electric circuit including the solar cells to be damaged is increased.

Accordingly, in spite of a reduced installation cost and acceptable discernability when compared to other kinds of pavement markers, due to the breakage or damage, limitations are imposed on the extensive use of the above-described kind of pavement marker, through an extended period of time.

Also, the reflective plates respectively attached to both side surfaces of the pavement marker to allow passage of lights therethrough can be stained with dirt or filth existing on the roadway, or a light emissivity through the reflective plates can be deteriorated under bad weather accompanied with rain, snow or fog, whereby discernability and a field of view of a driver can be abruptly degraded.

Moreover, the degradation in discernability and field of view can result in a traffic accident, and, thereby, a loss of manpower and material resources can be caused.

SUMMARY OF THE INVENTION

Accordingly, the present invention has been made in an effort to solve the problems occurring in the related art, and an object of the present invention is to provide a pavement marker in which light emitting lamps are installed in such a way as to horizontally project from a solar cell assembly, and the solar cell assembly has formed therein epoxy layers, whereby a light emissivity through reflective plates respectively attached to both side surfaces of the pavement marker is maximized and a strength of the pavement marker is improved; and a method for manufacturing the same.

Another object of the present invention is to provide a pavement marker in which a packing member is fitted into a packing member fitting groove defined on a lower surface of a transparent resin block, whereby moisture contained in the ground is prevented from leaking into a solar cell assembly, and thereby waterproofness is accomplished.

In order to achieve the above objects, according to one aspect of the present invention, there is provided a pavement marker in which a solar cell assembly is arranged between an upper case defined through its upper wall with a sunlight opening and a lower cover formed on its lower surface with a stem portion, the solar cell assembly having solar cells and light emitting lamps, and reflective plates are respectively attached to both side surfaces of the upper case, wherein the solar cell assembly includes a transparent resin block having an upper wall, support protrusions are formed on an inner surface of the upper wall of the transparent resin block, and a solar cell set having the solar cells and a printed circuit board is disposed in the transparent resin block in such a way as to be brought into contact with the support protrusions; wherein a plurality of airtight bosses are horizontally and projectedly formed on both side surfaces of the transparent resin block, a plurality of lead wire insertion holes are defined through both side walls of the transparent resin block in the plurality of airtight bosses, respectively, and the light emitting lamps are respectively fitted into the airtight bosses and electrically connected with the solar cell set through the lead wire insertion holes, with only base portions of the light emitting lamps received in the airtight bosses and body portions of the light emitting lamps projecting out of the airtight bosses; and wherein epoxy layers are formed inside the transparent resin block in a manner such that the solar cell set is sandwiched between the epoxy layers, the lead wire insertion holes are sealed and the light emitting lamps are firmly fixed with respect to the airtight bosses.

According to another aspect of the present invention, the transparent resin block is defined on a lower surface thereof with a packing member fitting groove, and a packing member is fitted into the packing member fitting groove so that waterproofness is ensured between the lower surface of the transparent resin block and an upper surface of the lower cover.

According to still another aspect of the present invention, there is provided a method for manufacturing a pavement marker in which a solar cell assembly is arranged between an upper case defined through its upper wall with a sunlight opening and a lower cover formed on its lower surface with a stem portion, the solar cell assembly having solar cells and light emitting lamps, and reflective plates are respectively attached to both side surfaces of the upper case, the method comprising: a first step of defining an accommodating space in a transparent resin block made of transparent resin, in a manner such that a lower end of the accommodating space is opened and a solar cell set which has the solar cells and a printed circuit board bonded with each other can be accommodated in the accommodating space, forming support protrusions on an inner surface of an upper wall of the transparent resin block, and forming airtight bosses on both side surfaces of the transparent resin block and defining lead wire insertion holes through both side walls of the transparent resin block in the airtight bosses, in a manner such that the light emitting lamps can be horizontally fitted into the airtight bosses, respectively; a second step of disposing the solar cell set in the accommodating space defined in the first step, in a manner such that the solar cell set is brought into contact with the support protrusions, fitting the light emitting lamps into the airtight bosses in a manner such that only base portions of the light emitting lamps are received in the airtight bosses and body portions of the light emitting lamps project out of the airtight bosses, and electrically connecting the light emitting lamps with the solar cell set through the lead wire insertion holes; a third step of injecting a predetermined amount of epoxy resin into the accommodating space defined in the transparent resin block in a manner such that the solar cell set disposed in the second step is encapsulated by the epoxy resin; a fourth step of forming epoxy layers inside the transparent resin block by discharging air for 30 minutes at 1 atmospheric pressure using a vacuum tank, in a manner such that the epoxy resin injected in the third step fills the accommodating space, the lead wire insertion holes, and clearances defined between the base portions of the light emitting lamps and the airtight bosses, and air contained in the epoxy resin is removed; and a fifth step of thermally setting at 70° C. for 30 minutes the epoxy layers formed by the epoxy resin, after air is discharged in the fourth step, in a manner such that the solar cell set is sandwiched between the epoxy layers inside the transparent resin block and the light emitting lamps are firmly fixed with respect to the airtight bosses.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
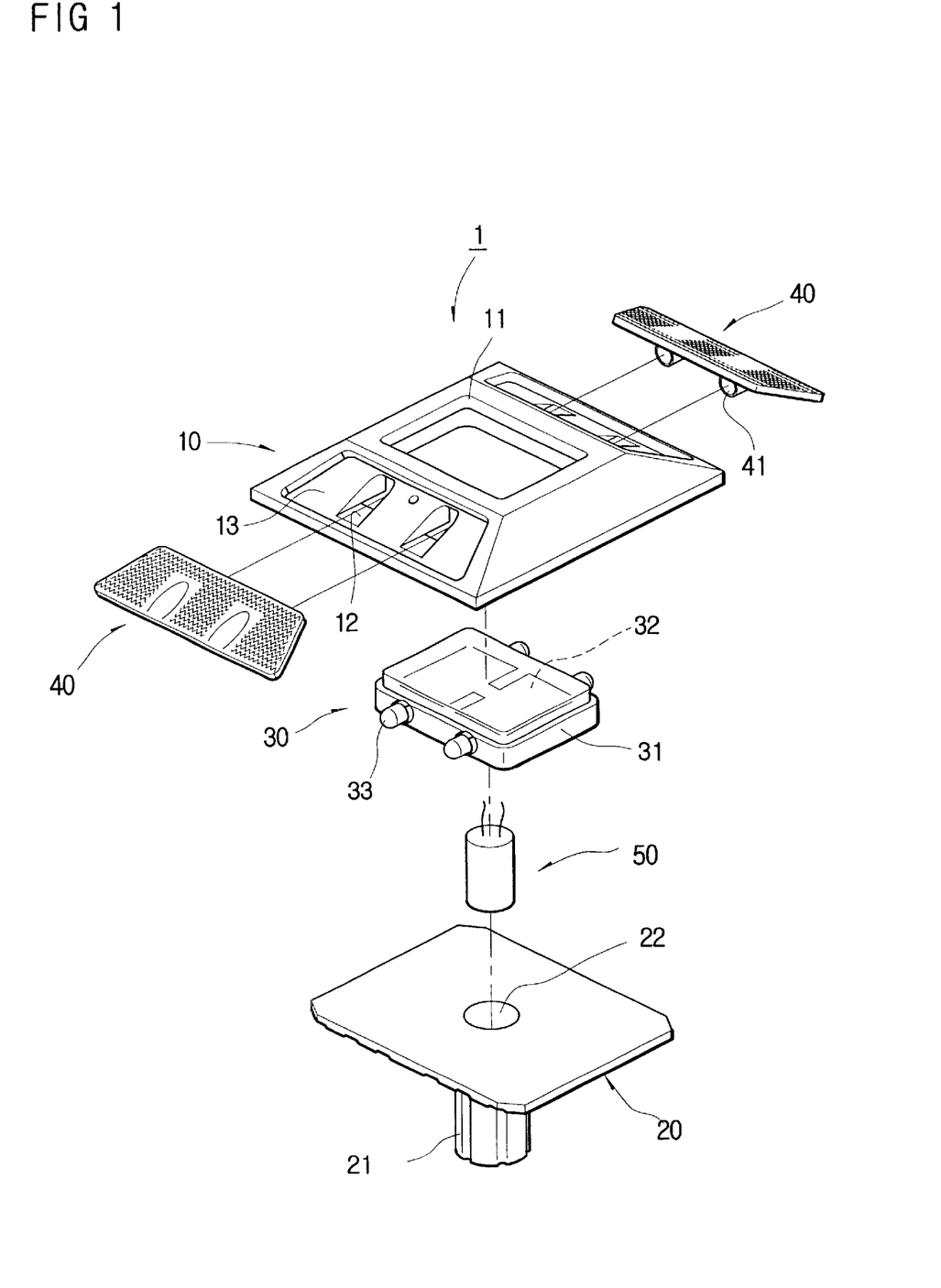
FIG. 1 is an exploded perspective view illustrating a pavement marker in accordance with an embodiment of the present invention.

Describing in detail a construction of a pavement marker in accordance with an embodiment of the present invention with reference to an exploded perspective view as shown in FIG. 1, the pavement marker 1 has an upper case 10 and a lower cover 20 which are coupled with each other. A solar cell assembly 30 is arranged between the upper case 10 and the lower cover 20. Reflective plates 40 are respectively attached to both side surfaces of the upper case 10, and a rechargeable battery 50 is received in the lower cover 20.

Here, the upper case 10 is defined through its upper wall with a sunlight opening 11, and a plurality of through-holes 12 are defined through both side walls of the upper case 10.

A pair of seating grooves 13 are respectively defined on both side walls of the upper case 10 around the through-holes 12.

The lower cover 20 has a rectangular cover portion. A stem portion 21 is integrally connected to a center part of the rectangular cover portion so as to projectedly extend downward. A receiving groove 22 is defined in the stem portion 21 through the cover portion, so that the rechargeable battery 50 can be received in the receiving groove 22.

On the other hand, the solar cell assembly 30 has a transparent resin block 31 which is made of transparent resin and a solar cell set 32 which is disposed in the transparent resin block 31. Light emitting lamps 33 are horizontally installed on both side walls of the transparent resin block 31.

The reflective plates 40 are respectively fitted into the pair of seating grooves 13 which are defined on both side walls of the upper case 10. Each reflective plate 40 is configured in a manner such that several pipe members 41 are horizontally secured to an inclined plate member and the pipe members 41 are inserted into the through-holes 12, respectively.

The solar cell assembly 30 is arranged between the upper case 10 and the lower cover 20. The solar cell set 32 disposed in the transparent resin block 31 absorbs solar energy through the sunlight opening 11 and converts the solar energy into electric energy. Electric energy is then stored in the rechargeable battery 50. Electric energy stored in this way is used to turn on the light emitting lamps 33 in the nighttime or under bad weather conditions so that discernability of the pavement marker 1 is secured.

The transparent resin block 31 is made of transparent resin so that the solar cell set 32 disposed in the transparent resin block 31 can reliably absorb solar energy through the transparent resin block 31. An upper wall of the transparent resin block 31 is positioned in the sunlight opening 11. The light emitting lamps 33 are horizontally installed on both side walls of the transparent resin block 31.

The light emitting lamps 33 are installed in such a way as to horizontally project at both sides of the solar cell assembly 30. The light emitting lamps 33 pass through the through-holes 12 and are positioned adjoining the reflective plates 40, whereby a light emissivity of the pavement marker 1 according to the present invention can be maximized.

Accordingly, due to the fact that the solar cell set 32 is disposed in the transparent resin block 31 and the light emitting lamps 33 are installed on both side walls of the transparent resin block 31, the solar cell assembly 30 has an increased structural integrity, whereby a strength of the pavement marker 1 according to the present invention is remarkably improved.

Figure 2:
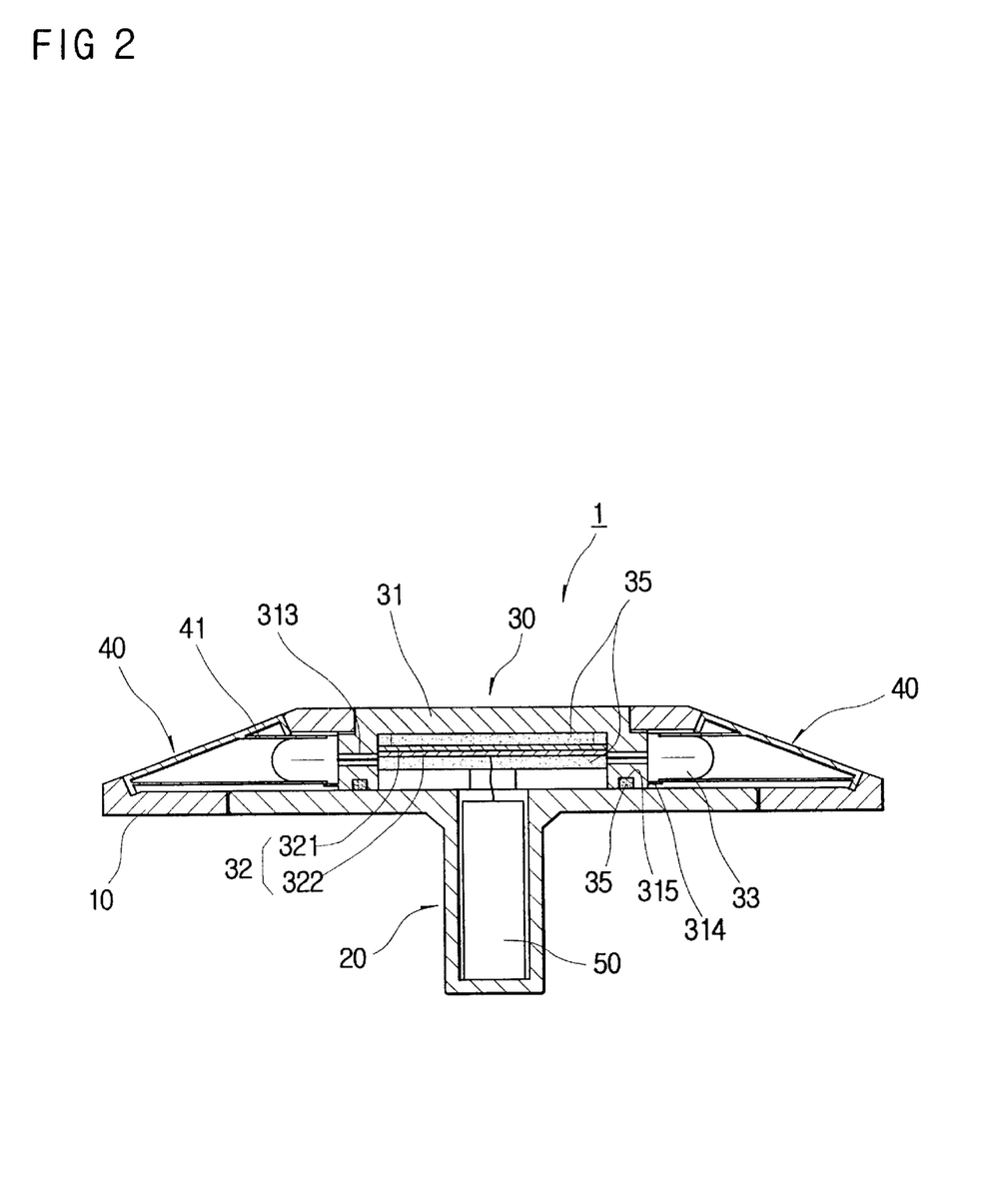
FIG. 2 is a cross-sectional view illustrating an assembled state of the pavement marker according to the present invention.

As can be readily seen from a cross-sectional view illustrating an assembled state of the pavement marker according to the present invention, shown in FIG. 2, the pavement marker 1 has the upper case 10 and the lower cover 20 which are coupled with each other. The solar cell assembly 30 is arranged between the upper case 10 and the lower cover 20. The reflective plates 40 are respectively attached to both side surfaces of the upper case 10, and the rechargeable battery 50 is received in the lower cover 20.

In the assembled state, the solar cell assembly 30 is fitted through the upper case 10, and the lower cover 20 is coupled to a lower end of the upper case 10 to support the solar cell assembly 30.

The solar cell assembly 30 has placed therein the solar cell set 32. The solar cell set 32 comprises solar cells 321 and a printed circuit board 322 which are bonded with each other.

Epoxy layers 34 are formed inside the transparent resin block 31 in a manner such that the solar cell set 32 is sandwiched between the epoxy layers 34.

In other words, the solar cell set 32 is disposed in the transparent resin block 31, and epoxy resin is injected into the transparent resin block 31 and thermally set to form the epoxy layers 34 for encapsulating the solar cell set 32. Due to the presence of the epoxy layers 34, the transparent resin block 31 and the solar cell set 32 are integrated with each other, whereby a strength of the solar cell assembly 30 is significantly improved.

The light emitting lamps 33 are installed on both side walls of the transparent resin block 31 so that they horizontally project to be inserted through the pipe members 41 of the reflective plates 40. To allow installation of the light emitting lamps 33, airtight bosses 314 are horizontally and projectedly formed on both side surfaces of the transparent resin block 31, and lead wire insertion holes 313 are defined through both side walls of the transparent resin block 31 in the airtight bosses 314, respectively.

As a consequence, the light emitting lamps 33, which are projectedly installed on both side walls of the transparent resin block 31, are inserted through the pipe members 41 of the reflective plates 40 after passing through the through-holes 12 defined through both side walls of the upper case 10, whereby a light emissivity of the light emitting lamps 33 through the reflective plates 40 can be maximized.

That is to say, by the fact that the light emitting lamps 33 are installed in such a way as to maximize a light emissivity, the pavement marker 1 according to the present invention markedly improves discernability and visibility of a driver.

The transparent resin block 31 is defined on a lower surface thereof with a packing member fitting groove 315, and a packing member 35 made of rubber is fitted into the packing member fitting groove 315. The packing member 35 is brought into close contact with an upper surface of the lower cover 20 to seal the solar cell assembly 30.

Due to this sealing effect rendered by the packing member 35, it is possible to prevent water or moisture contained in the ground from leaking into the solar cell assembly 30, whereby shorting of an electric circuit can be avoided.

Figure 3:
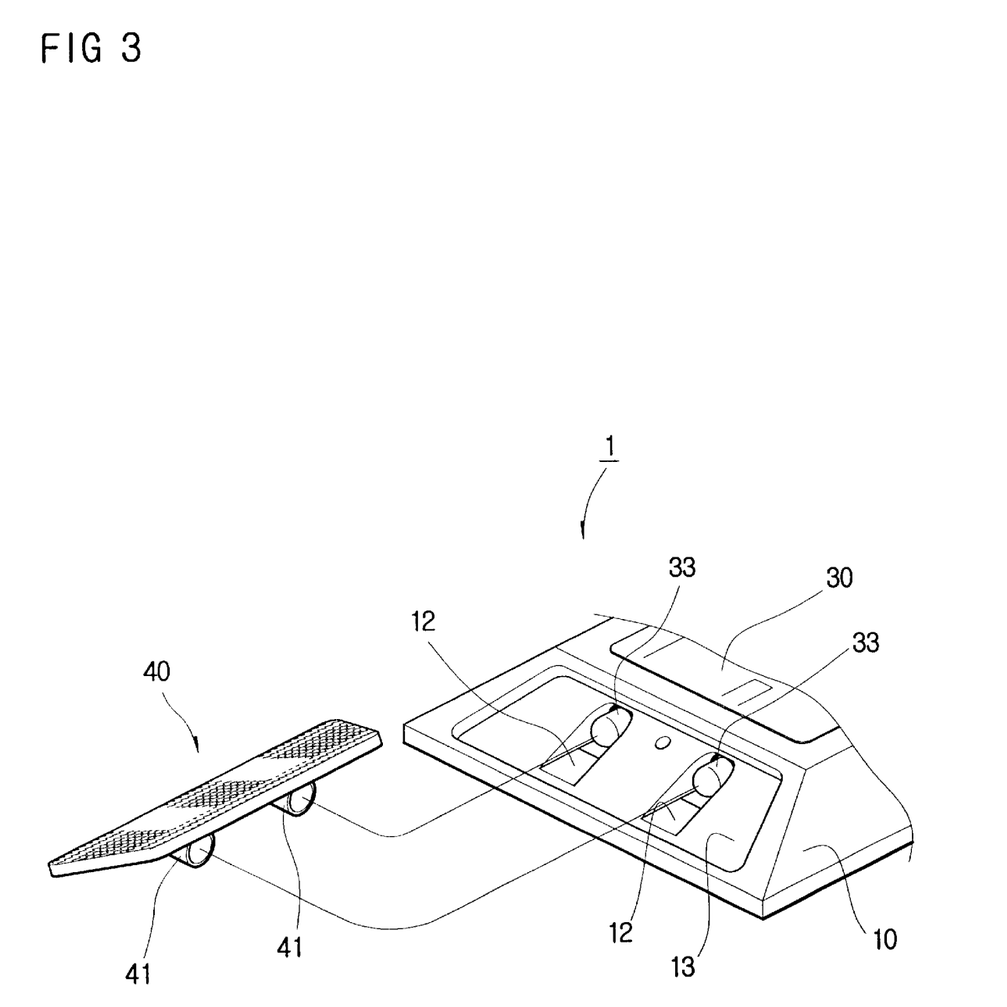
FIG. 3 is a partial perspective view illustrating an assembling pattern of the pavement marker according to the present invention.

Considering a partial perspective view illustrating an assembling pattern of the pavement marker according to the present invention, as shown in FIG. 3, the solar cell assembly 30 is arranged between the upper case 10 and the lower cover 20. The reflective plates 40 are respectively attached to both side surfaces of the upper case 10. The solar cell assembly 30 is fitted through the sunlight opening 11 defined through the upper wall of the upper case 10, so that an upper surface of the solar cell assembly 30 is flushed with an upper surface of the upper case 10. The light emitting lamps 33 which are installed in such a way as to horizontally project from both side surfaces of the solar cell assembly 30 are inserted into the pipe members 41 of the reflective plates 40 after passing through the through-holes 12.

At this time, the light emitting lamps 33 are installed in a manner such that it horizontally projects from both side surfaces of the solar cell assembly 30, and then, inserted into the pipe members 41 of the reflective plates 40. Thus, even when outer surfaces of the reflective plates 40 are stained with dirt or filth existing on a roadway, lights emitted from the light emitting lamps 33 can pass through the outer surfaces of the reflective plates 40 in a sufficient manner. As a result, as a quantity of light capable of rendering a sufficient degree of discernability to the driver is outputted through the reflective plates 40, visibility of the driver is secured.

Also, due to the fact that the light emitting lamps 33 are installed in such a way as to horizontally project from both side surfaces of the solar cell assembly 30 and inserted into the pipe members 41 of the reflective plates 40, even under bad weather accompanied with rain, snow or fog, a quantity of light outputted to the outside is maximized, whereby visibility of the driver is effectively secured.

Figure 4:
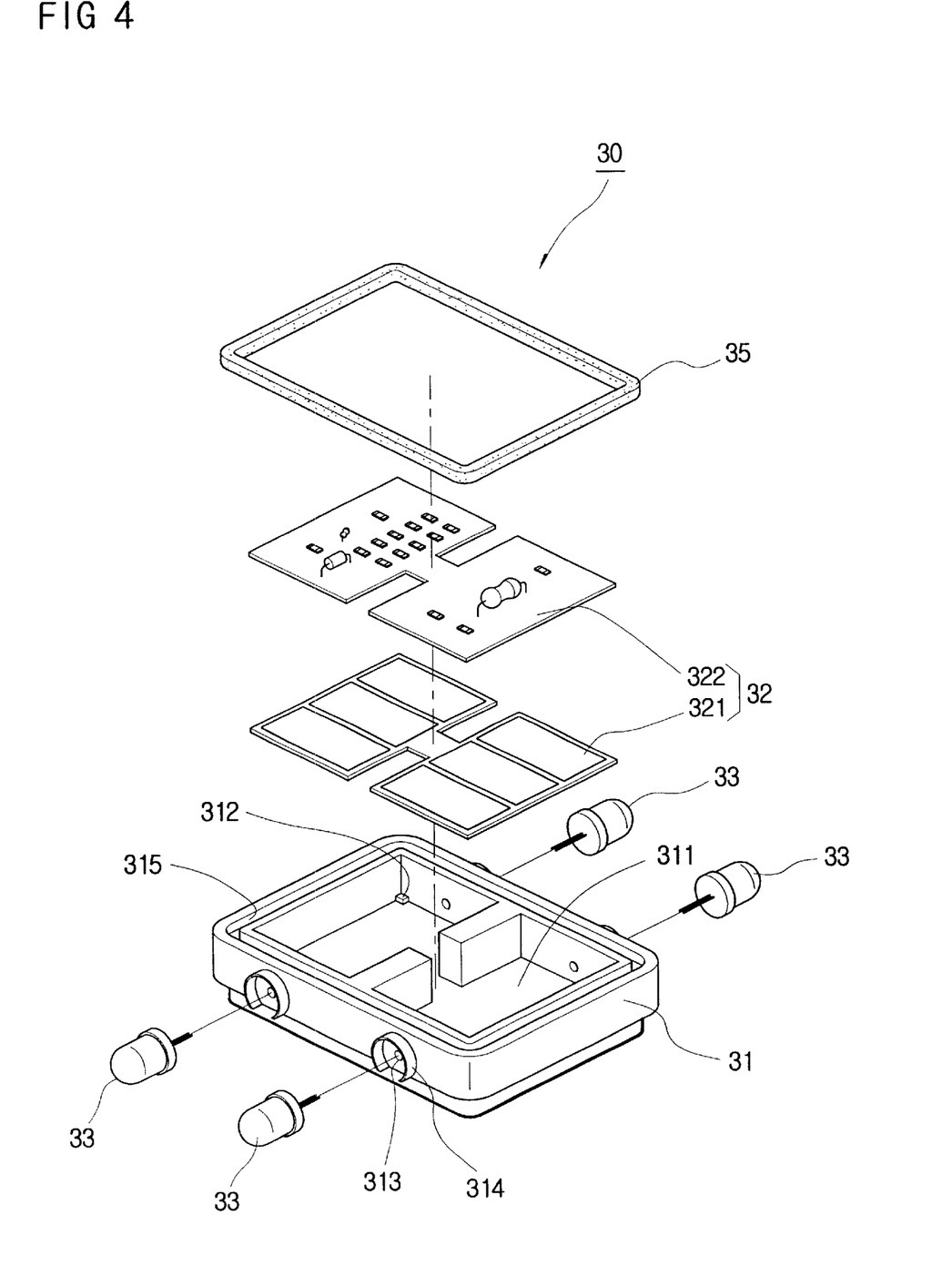
FIG. 4 is an exploded perspective view illustrating a solar cell assembly of the pavement marker according to the present invention.

Observing an exploded perspective view independently illustrating the solar cell assembly of the pavement marker according to the present invention, as shown in FIG. 4, the solar cell assembly 30 has the transparent resin block 31 which serves as a housing. The solar cell set 32, which comprises the solar cells 321 and the printed circuit board 322 bonded with each other, is disposed in the transparent resin block 31. The light emitting lamps 33 are installed on both side walls of the transparent resin block 31, and the packing member 35 is fitted into the packing member fitting groove 315 which is defined on the lower surface of the transparent resin block 31.

Here, support protrusions 312 are formed on an inner surface of the upper wall of the transparent resin block 31, so that the solar cell set 32 can be held separated from the inner surface of the upper wall rather than being brought into contact therewith, and thereby a room is defined between an upper surface of the solar cell set 32 and the inner surface of the upper wall of the transparent resin block 31.

In order to allow installation of the light emitting lamps 33, the transparent resin block 31 is defined with the lead wire insertion holes 313 and formed with airtight bosses 314. The light emitting lamps 33 are fitted into the airtight bosses 314 in a manner such that only base portions of the light emitting lamps 33 are received in the airtight bosses 314 and body portions of the light emitting lamps 33 project out of the airtight bosses 314. By inserting lead wires of the light emitting lamps 33 through the lead wire insertion holes 313 and then electrically connecting the lead wires to the printed circuit board 322, the installation of the light emitting lamps 33 is completed.

Also, the packing member 35 is fitted into the packing member fitting groove 315 which is defined on the lower surface of the transparent resin block 31. The packing member 35 functions to seal the transparent resin block 31.

Figure 5:
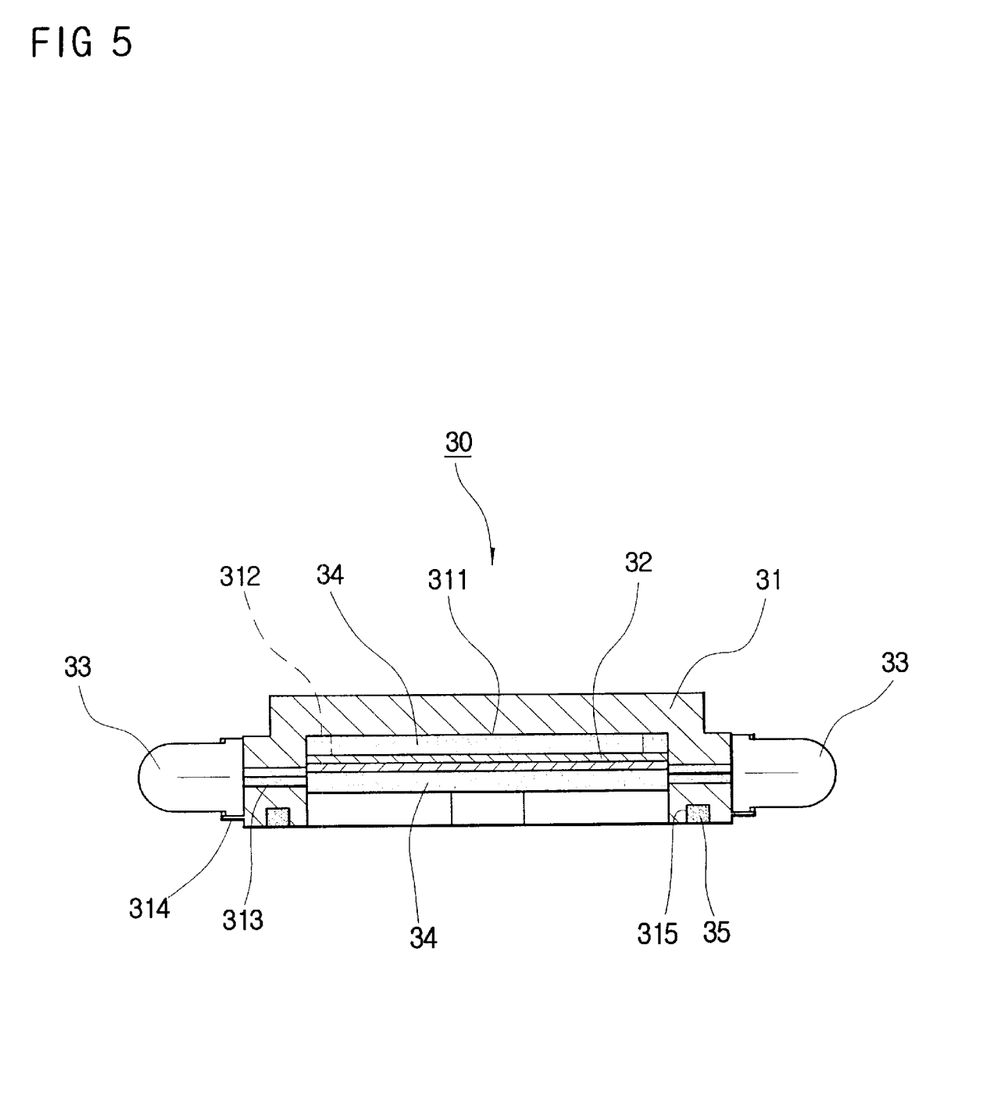
FIG. 5 is a cross-sectional view illustrating an assembled state of the solar cell assembly according to the present invention.

Referring to FIG. 5 which is a cross-sectional view illustrating an assembled state of the solar cell assembly according to the present invention, the solar cell assembly 30 has the transparent resin block 31 which serves as a housing. The solar cell set 32 is disposed in the transparent resin block 31. The packing member 35 is fitted into the packing member fitting groove 315 defined on the lower surface of the transparent resin block 31. The light emitting lamps 33 are installed on both side walls of the transparent resin block 31.

Here, epoxy resin is injected into the transparent resin block 31 and then thermally set to form the epoxy layers 34, in a manner such that the solar cell set 32 is encapsulated by the epoxy layers 34, the lead wire insertion holes 313 through which the lead wires of the light emitting lamps 33 pass are sealed, and the light emitting lamps 33 are firmly fixed with respect to the airtight bosses 314. At this time, the epoxy layers 34 are formed so that the solar cell set 32 disposed in the transparent resin block 31 and the light emitting lamps 33 are integrated with the transparent resin block 31, whereby a strength of the solar cell assembly 30 is significantly improved, and thereby breakage or damage of the pavement marker 1 according to the present invention due to repeated load application is prevented.

It is preferred that the epoxy layer 34 is formed of epoxy resin which has a transparent and flexible nature and a thermosetting property and does not undergo volume change after being thermally set.

The light emitting lamps 33 are installed in such a way as to horizontally project from both side walls of the transparent resin block 31 so that the base portions of the light emitting lamps 33 are fitted into the airtight bosses 314 and the body portions of the light emitting lamps 33 project out of the airtight bosses 314, and the lead wires of the light emitting lamps 33 are inserted through the lead wire insertion holes 313 and then electrically connected to the solar cell set 32. Therefore, due to horizontal projection of the light emitting lamps 33, a light emissivity of the pavement marker 1 according to the present invention is maximized, and thereby discernability and visibility of the driver are remarkably improved.

In addition, due to the fact that the packing member 35 is fitted into the packing member fitting groove 315 defined on the lower surface of the transparent resin block 31, moisture contained in the ground is prevented from leaking into the transparent resin block 31 through the lower end of the transparent resin block 31, whereby shorting of the electrical circuit can be avoided, and the pavement marker 1 according to the present invention can be used for an extended period of time.

Figure 6:
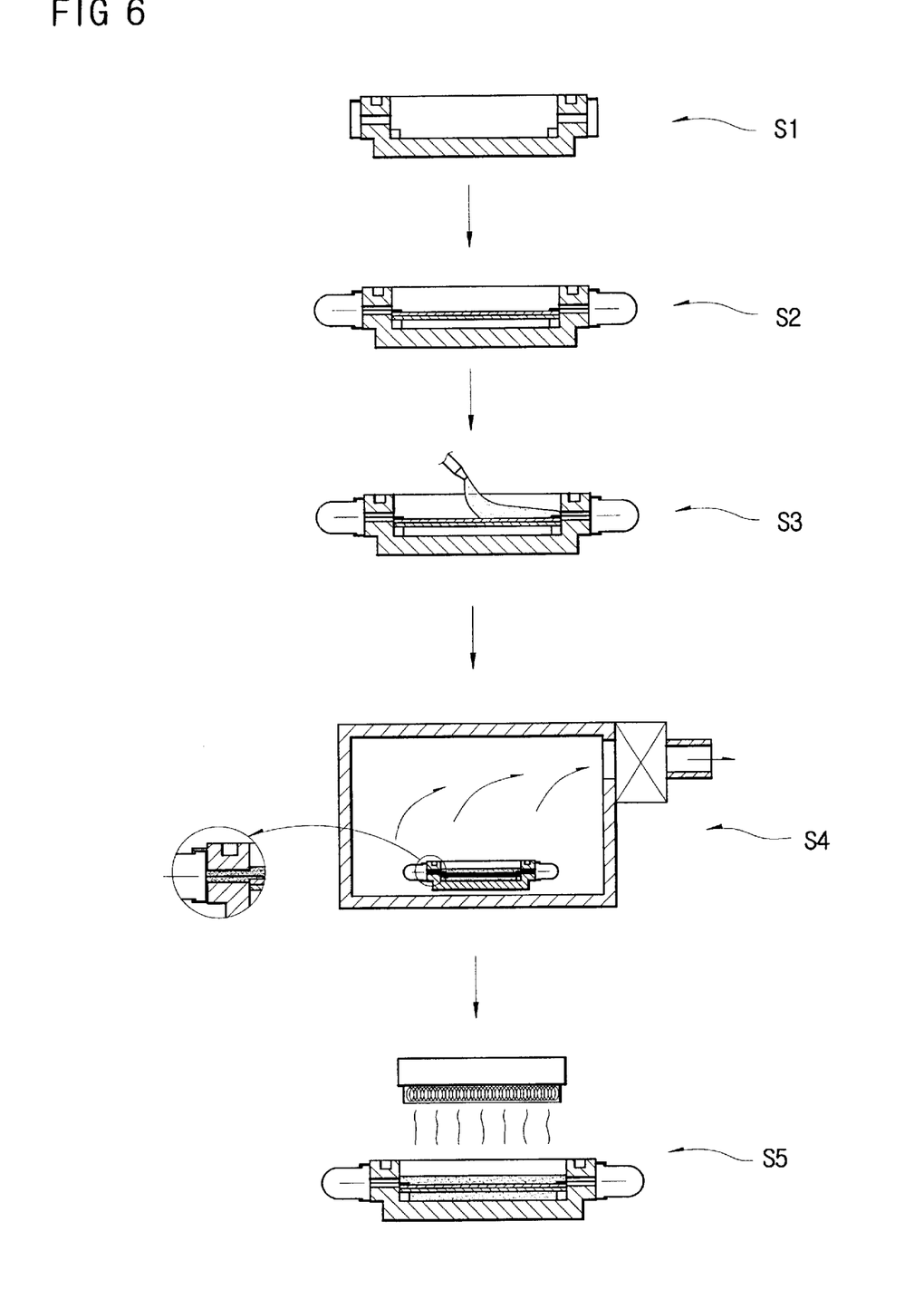
FIG. 6 is stepwise cross-sectional views for explaining a method for manufacturing the pavement marker according to the present invention.

FIG. 6 is stepwise cross-sectional views for explaining a method for manufacturing the pavement marker according to the present invention. As described above, in the pavement marker 1, the solar cell assembly 30 is arranged between the upper case 10 defined through its upper wall with the sunlight opening 11 and the lower cover 20 formed on its lower surface with the stem portion 21. The solar cell assembly 30 has the solar cell set 32 which comprises the solar cells 321 and the printed circuit board 322 and the light emitting lamps 33. The reflective plates 40 are respectively attached to both side surfaces of the upper case 10.

A procedure for manufacturing the solar cell assembly 30 includes a first step S1 of defining an accommodating space 311 and the lead wire insertion holes 313 in and through the transparent resin block 31 made of transparent resin and forming the airtight bosses 314 on both side walls of the transparent resin block 31, a second step S2 of disposing the solar cell set 32 in the accommodating space 311 and installing the light emitting lamps 33 into the airtight bosses 314 and through the lead wire insertion holes 313, a third step S3 of injecting epoxy resin into the transparent resin block 31, a fourth step S4 of forming the epoxy layers 34 by discharging air using a vacuum tank so that the epoxy resin injected in the third step S3 completely fills an unoccupied portion of the accommodating space 311, and a fifth step S5 of thermally setting the epoxy resin which is filled in the unoccupied portion of the accommodating space 311 in the fourth step S4 so that the solar cell set 32 is sandwiched between the epoxy layers 34 inside the transparent resin block 31 and the light emitting lamps 33 are firmly fixed with respect to the airtight bosses 314.

Concretely speaking, in the first step S1, the accommodating space 311 is defined in the transparent resin block 31 so that the solar cell set 32 can be disposed in the accommodating space 311, the support protrusions 312 are formed on the inner surface of the upper wall of the transparent resin block 31 so that the solar cell set 32 can be held separated from the inner surface of the upper wall rather than being brought into contact therewith, the airtight bosses 314 are formed on both side surfaces of the transparent resin block 31, and the lead wire insertion holes 313 are defined through both side walls of the transparent resin block 31 in the airtight bosses 314, in a manner such that the light emitting lamps 33 can be horizontally fitted into the airtight bosses 314, respectively.

In the second step S2, the solar cell set 32 is disposed in the accommodating space 311 which is defined in the first step S1, in a manner such that the solar cell set 32 is brought into contact with the support protrusions 312, the light emitting lamps 33 are fitted into the airtight bosses 314 in a manner such that only the base portions of the light emitting lamps 33 are received in the airtight bosses 314 and the body portions of the light emitting lamps 33 project out of the airtight bosses 314, and the light emitting lamps 33 are electrically connected with the solar cell set 32 through the lead wire insertion holes 313. In this way, the solar cell set 32 and the light emitting lamps 33 are mounted with respect to the transparent resin block 31.

In the third step S3, a predetermined amount of epoxy resin is injected into the accommodating space 311 which is defined in the transparent resin block 31, in a manner such that the solar cell set 32 disposed in the second step S2 is encapsulated by the epoxy resin.

In the fourth step S4, the epoxy layers 34 are formed inside the transparent resin block 31 by discharging air for 30 minutes at 1 atmospheric pressure using the vacuum tank, in a manner such that the epoxy resin injected in the third step S3 fills the accommodating space 311, the lead wire insertion holes 313, and clearances defined between the base portions of the light emitting lamps 33 and the airtight bosses 314, and air contained in the epoxy resin is removed.

In the fifth step S5, after air is discharged in the fourth step, the epoxy layers 34 which are formed by the epoxy resin are thermally set at 70° C. for 30 minutes, in a manner such that the solar cell set 32 is sandwiched between the epoxy layers 34 inside the transparent resin block 31 and the light emitting lamps 33 are firmly fixed with respect to the airtight bosses 314.

Thus, the first and second steps S1 and S2 allow the solar cell set 32 and the light emitting lamps 33 to be easily mounted with respect to the transparent resin block 31. In the fourth step S4, the epoxy layers 34 are formed inside the transparent resin block 31 in a manner such that the epoxy resin injected in the third step S3 fills the accommodating space 311, the lead wire insertion holes 313, and clearances defined between the base portions of the light emitting lamps 33 and the airtight bosses 314, and air contained in the epoxy resin is removed, whereby degradation in bonding force and strength is prevented.

Also, in the fifth step S5, the epoxy layers 34 which are formed by the epoxy resin are thermally set, in a manner such that the transparent resin block 31, the solar cell set 32 and the light emitting lamps 33 are integrated one with another, whereby a strength of the solar cell assembly 30 is significantly improved.

As apparent from the above descriptions, the pavement marker according to the present invention provides advantages in that, since light emitting lamps are installed in such a way as to horizontally project from a solar cell assembly and the solar cell assembly has formed therein epoxy layers, a light emissivity through reflective plates respectively attached to both side surfaces of the pavement marker is maximized and a strength of the pavement marker is improved. Due to these facts, even when the reflective plates are stained with dirt or filth existing on the roadway or even under bad weather conditions, discernability and visibility are not impaired. Also, the pavement marker is prevented from being broken or damaged by repeated load application thereonto, whereby a lifetime of the pavement marker can be extended. In addition, due to the increase in light emissivity, a spacing between two pavement markers can be lengthened, and thereby a cost can be saved.

Further, in the present invention, because a packing member is fitted into a packing member fitting groove defined on a lower surface of a transparent resin block, moisture contained in the ground is prevented from leaking into the solar cell assembly, and thereby waterproofness is accomplished. Thus, it is possible to avoid malfunction of the pavement marker, and maintenance fee and time can be reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A pavement marker in which a solar cell assembly is arranged between an upper case defined through its upper wall with a sunlight opening and a lower cover formed on its lower surface with a stem portion, the solar cell assembly having solar cells and light emitting lamps, and reflective plates are respectively attached to both side surfaces of the upper case, wherein the solar cell assembly includes a transparent resin block having an upper wall, support protrusions are formed on an inner surface of the upper wall of the transparent resin block, and a solar cell set having the solar cells and a printed circuit board is disposed in the transparent resin block in such a way as to be brought into contact with the support protrusions; wherein a plurality of airtight bosses are horizontally and projectedly formed on both side surfaces of the transparent resin block, a plurality of lead wire insertion holes are defined through both side walls of the transparent resin block in the plurality of airtight bosses, respectively, and the light emitting lamps are respectively fitted into the airtight bosses and electrically connected with the solar cell set through the lead wire insertion holes, with only base portions of the light emitting lamps received in the airtight bosses and body portions of the light emitting lamps projecting out of the airtight bosses; and wherein epoxy layers are formed inside the transparent resin block in a manner such that the solar cell set is sandwiched between the epoxy layers, the lead wire insertion holes are sealed and the light emitting lamps are firmly fixed with respect to the airtight bosses.

2. The pavement marker as claimed in claim 1, wherein the transparent resin block is defined on a lower surface thereof with a packing member fitting groove, and a packing member is fitted into the packing member fitting groove so that waterproofness is ensured between the lower surface of the transparent resin block and an upper surface of the lower cover.

3. A method for manufacturing a pavement marker in which a solar cell assembly is arranged between an upper case defined through its upper wall with a sunlight opening and a lower cover formed on its lower surface with a stem portion, the solar cell assembly having solar cells and light emitting lamps, and reflective plates are respectively attached to both side surfaces of the upper case, the method comprising:

a first step of defining an accommodating space in a transparent resin block made of transparent resin, in a manner such that a lower end of the accommodating space is opened and a solar cell set which has the solar cells and a printed circuit board bonded with each other can be accommodated in the accommodating space, forming support protrusions on an inner surface of an upper wall of the transparent resin block, and forming airtight bosses on both side surfaces of the transparent resin block and defining lead wire insertion holes through both side walls of the transparent resin block in the airtight bosses, in a manner such that the light emitting lamps can be horizontally fitted into the airtight bosses, respectively;

a second step of disposing the solar cell set in the accommodating space defined in the first step, in a manner such that the solar cell set is brought into contact with the support protrusions, fitting the light emitting lamps into the airtight bosses in a manner such that only base portions of the light emitting lamps are received in the airtight bosses and body portions of the light emitting lamps project out of the airtight bosses, and electrically connecting the light emitting lamps with the solar cell set through the lead wire insertion holes;

a third step of injecting a predetermined amount of epoxy resin into the accommodating space defined in the transparent resin block in a manner such that the solar cell set disposed in the second step is encapsulated by the epoxy resin;

a fourth step of forming epoxy layers inside the transparent resin block by discharging air for 30 minutes at 1 atmospheric pressure using a vacuum tank, in a manner such that the epoxy resin injected in the third step fills the accommodating space, the lead wire insertion holes, and clearances defined between the base portions of the light emitting lamps and the airtight bosses, and air contained in the epoxy resin is removed; and a fifth step of thermally setting at 70° C. for 30 minutes the epoxy layers formed by the epoxy resin, after air is discharged in the fourth step, in a manner such that the solar cell set is sandwiched between the epoxy layers inside the transparent resin block and the light emitting lamps are firmly fixed with respect to the airtight bosses.

* * * * *